US006837549B2

(12) United States Patent
Ito et al.

(10) Patent No.: US 6,837,549 B2
(45) Date of Patent: Jan. 4, 2005

(54) LIGHT ALLOY WHEEL FOR VEHICLE AND METHOD AND APPARATUS FOR PRODUCING SAME

(75) Inventors: Hajime Ito, Saitama-ken (JP); Minoru Kanai, Saitama-ken (JP); Masanobu Taniguchi, Saitama-ken (JP); Kenji Usui, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/041,631

(22) Filed: Jan. 10, 2002

(65) Prior Publication Data
US 2002/0158504 A1 Oct. 31, 2002

(30) Foreign Application Priority Data

Jan. 11, 2001 (JP) .......................................... 2001-003859

(51) Int. Cl.[7] .................................................. B60B 3/06
(52) U.S. Cl. .................................... 301/64.101; 301/65
(58) Field of Search ....................... 301/64.101, 64.102, 301/65, 104; 29/894.34, 894.344

(56) References Cited

U.S. PATENT DOCUMENTS

| 1,346,863 | A | * | 7/1920 | Walther |  |
|---|---|---|---|---|---|
| 1,414,662 | A | * | 5/1922 | Morgan |  |
| 1,502,759 | A | * | 7/1924 | Wade |  |
| 1,685,130 | A | * | 9/1928 | Holt |  |
| 1,964,129 | A | * | 6/1934 | Miller | 301/6.7 |
| 1,991,489 | A | * | 2/1935 | Booth |  |
| 4,165,131 | A | * | 8/1979 | Thompson |  |
| 4,799,534 | A |   | 1/1989 | Ueno et al. |  |
| 5,527,101 | A | * | 6/1996 | Kato et al. | 301/65 |

FOREIGN PATENT DOCUMENTS

| DE | 4013603 | * | 2/1991 | .................. 301/65 |
|---|---|---|---|---|
| EP | 0 273 586 A2 |   | 7/1988 |  |
| EP | 0 423 447 A2 |   | 4/1991 |  |
| EP | 0 785 038 A2 |   | 7/1997 |  |
| EP | 0 949 022 A1 |   | 10/1999 |  |
| FR | 547437 | * | 12/1922 | .................. 301/65 |
| FR | 2 740 077 A |   | 4/1997 |  |
| GB | 2 153 724 A |   | 8/1985 |  |
| JP | 02-147401 |   | 6/1990 |  |
| JP | 05-269563 |   | 10/1993 |  |
| WO | WO 99/21726 A |   | 6/1999 |  |

OTHER PUBLICATIONS

Machinery's Handbook; 26th Edition; Erik Oberg et al; 2000.*

* cited by examiner

Primary Examiner—Russell D. Stormer
(74) Attorney, Agent, or Firm—Sughrue Mion, PLLC

(57) ABSTRACT

A light alloy wheel for a vehicle comprising a disc portion comprising a hub portion and a design portion and a rim portion, the design portion having as-die-cast spoke portions having a taper angle of less than 5.0°. This wheel can be produced by using a casting apparatus comprising a die assembly comprising at least a stationary lower die and a movable upper die, a movable platen to which the upper die is fixed, a first cylinder and at least three synchronous second cylinders mounted onto a frame of the apparatus for moving the movable platen; driving the first cylinder to slowly reduce the clamping force of the lower die and the upper die; synchronously driving the second cylinders to elevate the movable platen in parallel from a position at which the lower die and the upper die are clamped to a position at which the wheel would not impinge on the lower die even if the movable platen were slanted; and then further elevating the movable platen by the first cylinder.

8 Claims, 17 Drawing Sheets

LIGHT ALLOY WHEEL FOR VEHICLE AND METHOD AND APPARATUS FOR PRODUCING SAME

FIELD OF THE INVENTION

The present invention relates to a die-cast light alloy wheel for a vehicle having thin spoke portions for providing extremely sharp impression, and a method and an apparatus for producing such a wheel.

PRIOR ART

Road wheels of automobiles have various shapes, and their materials have been changing from iron to light alloys such as aluminum alloys, magnesium alloys, titanium alloys, etc. for the purpose of reduction of weight and improvement in appearance and design of automobiles. Particularly because aluminum is a lightweight alloy having relatively low cost, the percentage of automobiles having aluminum wheels is recently increasing dramatically.

As shown in FIG. 18, a light alloy wheel 30 generally consists of a thick hub portion 31 mounted onto an axle with bolts and nuts, a disc portion having a design portion 32 provided with both thick portions and thin portions, and a thin rim portion 33 onto which a tire is mounted. The rim portion 33 is constituted by a front flange portion, a rear flange portion, a cross portion in which a rim portion and a disc portion are crossing, and a center rim portion. The design portion 32 has spoke portions 34 and design recesses 35. The hub portion 31 is provided with bolt hole recesses 36 into which bolts are inserted to fix the wheel to a vehicle body.

Wheels having great influence on the appearance of vehicles have various shapes largely classified to four types; a spoke type, a dish type, a fin type and a mesh type. The spoke-type wheel is a wheel designed to have 3–10 spokes extending from the hub portion to the rim portion. The dish-type wheel is a wheel having a hub portion having a smoother surface in a considerably wide area than the spoke-type wheel, and a substantially disc-shaped design portion connected to the rim portion with short spokes. The fin-type wheel is a wheel having a relatively large number of thin spokes. The mesh-type wheel also has a relatively large number of thin spokes, the spokes being in a mesh shape between the hub portion and the rim portion.

In a mesh-type, spoke-type or fin-type wheel, spoke portions extending from a thick hub portion to a rim portion have various shapes, and to impart the impression of speed and functionality, etc. to the overall design of a vehicle, it is desired that the spoke portions have shapes having sharp appearance.

To obtain sharp appearance, it is effective to make the spoke portions narrower in a design portion. However, it is difficult from the aspect of a casting design to make the spoke portions narrower, namely to make the spoke portions have smaller taper angles. Reasons therefor are as follows: In the die casting of a light alloy wheel for a vehicle, with a die having a cavity for a front surface of a design portion combined with a die having a cavity for a rear surface of a design portion, a melt is injected into the combined cavity. Therefore, the spoke portions should have relatively large taper angles, so that the design portion can easily be separated from the die cavity in a wheel axis direction. For instance, in a wheel shown in FIG. 18, the spoke portions have taper angles of 6–8°. If the taper angles were small, the spoke portions would not easily be separated from the die, resulting in scratch on the tapered surfaces by their sliding on the die. Though the taper angles of the spoke portions can be made smaller by using such methods as forging, cutting, etc., such methods lead to high production cost.

In dent portions formed on the rear side of the spoke portions, too, taper angles are provided for separation from the die. For the same reasons as described above, however, it has conventionally been difficult to make their taper angles smaller in mass production, and good die separation could not be achieved without taper angles of at least about 6–8°. Accordingly, as shown in FIG. 9, the dent portions 37 of the hub portion and the spoke portions should have tapered surfaces 39 having relatively large slanting angles α'. Because of this structure, a cast portion 34b having a tapered surface of a slanting angle α' remains in an as-die-cast state, in addition to a cast portion 34a having a tapered surface of a slanting angle α, which is indispensable for strength, and the cast portion 34b should be removed by working later. Accordingly, it is difficult to reduce the weight of a wheel having thin spoke portions.

OBJECTS OF THE INVENTION

Accordingly, an object of the present invention is to provide a light alloy wheel for a vehicle, which has narrow spoke portions with small taper angles, thereby having sharp impression and reduced weight.

Another object of the present invention is to provide a light alloy wheel for a vehicle, which has spoke portions with small taper angles, whereby it can have reduced weight even if its design portion has various shapes.

A further object of the present invention is to provide a light alloy wheel for a vehicle, which has spoke portions with small taper angles and dent portions on the rear side, whereby it has high strength free from casting defects even if the spoke portions have small cross sections.

A still further object of the present invention is to provide a method and an apparatus for producing such a light alloy wheel for a vehicle.

SUMMARY OF THE INVENTION

As a result of intense research in view of the above objects, the inventors have found that by improving the conditions of controlling die-opening operations and elevating a movable platen as die casting conditions for a light alloy wheel for a vehicle, it is possible to obtain a light alloy wheel for a vehicle having sharp impression and reduced weight because of small taper angles in spoke portions. The present invention has been completed based on this finding.

Thus, the light alloy wheel for a vehicle according to the present invention comprises a disc portion comprising a hub portion and a design portion and a rim portion, the design portion having substantially as-die-cast spoke portions having at least partially taper angles of less than 5.0°. Here, "substantially as-die-cast" means that no work is done after die casting to such an extent of affecting a taper angle.

A substantially as-die-cast dent portion having at least partially a taper angle of less than 5.0° is preferably formed on the rear side of each spoke portion.

The first method for producing a light alloy wheel for a vehicle according to the present invention comprises using a casting apparatus comprising a die assembly comprising at least a stationary lower die and a movable upper die, a movable platen to which the upper die is fixed, and one cylinder mounted onto a frame of the apparatus for moving the movable platen; and driving the cylinder to slowly reduce the clamping force of the lower die and the upper die. The reduction of the die-clamping force by the cylinder is preferably carried out by reducing a piston-lowering hydraulic pressure of the cylinder to zero over a time period of 0.05 seconds or more while a constant piston-elevating hydraulic pressure is applied to the cylinder.

The second method for producing a light alloy wheel for a vehicle according to the present invention comprises using a casting apparatus comprising a die assembly comprising at least a stationary lower die and a movable upper die, a movable platen to which the upper die is fixed, and a first cylinder and at least three synchronous second cylinders both mounted onto a frame of the apparatus for moving the movable platen; synchronously driving the second cylinders to elevate the movable platen in parallel from a position at which the lower die and the upper die are clamped to a position at which the wheel would not impinge on the lower die even if the movable platen were slanted; and then further elevating the movable platen by the first cylinder.

The third method for producing a light alloy wheel for a vehicle according to the present invention comprises using a casting apparatus comprising a die assembly comprising at least a stationary lower die and a movable upper die, a movable platen to which the upper die is fixed, a first cylinder and at least three synchronous second cylinders mounted onto a frame of the apparatus for moving the movable platen; driving the first cylinder to slowly reduce the clamping force of the lower die and the upper die; synchronously driving the second cylinders to elevate the movable platen in parallel from a position at which the lower die and the upper die are clamped to a position at which the wheel would not impinge on the lower die even if the movable platen were slanted; and then further elevating the movable platen by the first cylinder. The reduction of the die-clamping force by the first cylinder is preferably carried out by reducing a piston-lowering hydraulic pressure of the first cylinder to zero over a time period of 0.05 seconds or more while a constant piston-elevating hydraulic pressure is applied to the first cylinder.

The apparatus for producing a light alloy wheel for a vehicle according to the present invention comprises a die assembly comprising at least a stationary lower die and a movable upper die, a movable platen to which the upper die is fixed, and a vertical movement mechanism of the movable platen mounted onto a frame of the casting apparatus; the vertical movement mechanism comprising (a) a first cylinder for moving the movable platen up and down, and (b) at least three second cylinders synchronously driven for elevating the movable platen in parallel from a position at which the lower die and the upper die are clamped to a position at which the wheel would not impinge on the lower die even if the movable platen were slanted; and the movable platen being elevated by the first cylinder above the upper limit position of the second cylinders.

The second cylinders are preferably four hydraulic cylinders arranged at symmetric positions of the frame.

30% or more, particularly 50% or more, of the tapered surfaces of the spoke portions preferable have taper angles of less than 5.0°. Further, at least part of the taper angles of the spoke portions are preferably 4.0° or less, particularly 3.5° or less.

When those having taper angles of less than 5.0° among the spoke portions have a minimum width of 5 mm or less and a height of 20 mm or more, the wheel can provide extremely sharp impression. The spoke portions can be cast such that a dent portion on the rear side of each spoke portion has a taper angle of less than 5.0°. The ceiling thickness of the spoke portion is preferably 5 mm or less.

At least part of the spoke portions preferably have a DAS value of less than 30 μm. Also, the maximum DAS value of the rim portion is preferably larger than the DAS value of the hub portion.

Because narrower and deeper dent portions can be formed according to the method of the present invention, thin spoke portions not only in the spoke-type wheel but also in the mesh-type or fin-type wheel can be provided with reduced weight. Both of the taper angle on a design surface and the taper angle of a dent portion on the rear side can be made 4.5° or less, further 4.0° or less, particularly 3.5° or less.

It is also possible to produce a light alloy wheel for a vehicle having a hub portion provided with bolt hole recesses having a taper angle of 5° or less. This makes it possible to provide the bolt hole recesses with high accuracy and high-quality impression that have conventionally been impossible.

The light alloy wheel having such features for a vehicle according to the present invention can be integrally cast by a low-pressure casting method.

BRIEF DESCRIPTION OF THE DRAWINGS

FIG. 10($b$) is a schematic view showing one example of apparatuses for casting light alloy wheels for vehicles according to the present invention, wherein an upper die has moved down to a die-clamping position;

FIG. 10($c$) is a schematic view showing one example of apparatuses for casting light alloy wheels for vehicles according to the present invention, wherein second hydraulic cylinders have been elevated to the upper limit position;

FIG. 11($b$) is a cross-sectional view taken along the line A—A in FIG. 10($a$), in which transverse movable dies are closed;

DESCRIPTION OF THE PREFERRED EMBODIMENTS

The light alloy wheel for a vehicle according to the present invention comprising a disc portion comprising a hub portion and a design portion and a rim portion is not limited to an integrally die-cast, one-piece wheel, but also includes a two-piece or three-piece wheel comprising a die-cast disc portion bonded to a rim portion produced by a different method. However, the present invention is most effective to cast one-piece, light alloy wheels.

Figure 4:
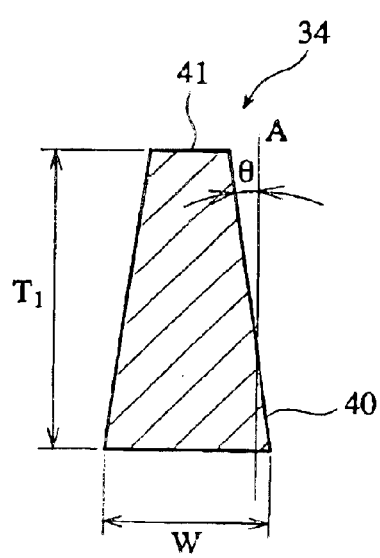
FIG. 4 is a partial cross-sectional view showing one example of a tapered surface of the spoke portion.
Figure 5:
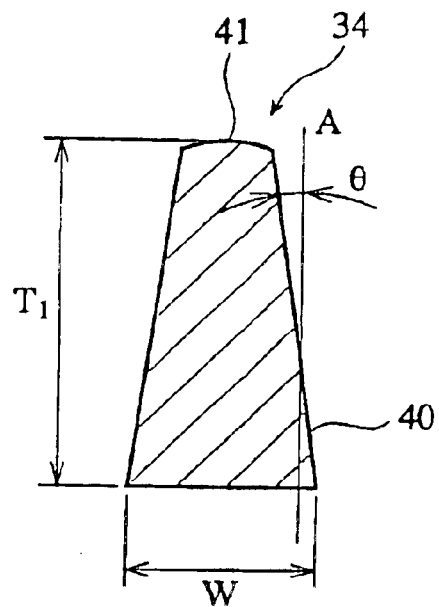
FIG. 5 is a partial cross-sectional view showing another example of a tapered surface of the spoke portion.

The spoke portions are a plurality of elongated ridge portions extending between a hub portion and a rim portion of the wheel. The taper angle of each spoke portion is an angle of the tapered surface of the spoke portion to a wheel axis direction, which is indicated by θ in FIGS. 4-6. For instance, when the tapered surface 40 is flat as shown in FIGS. 4 and 5, the taper angle is an angle θ of the tapered surface 40 to the wheel axis direction A, regardless of whether the spoke portion 34 has a flat top surface 41 (FIG. 4) or a curved top surface 41 (FIG. 5) on the side of a design surface. However, when the spoke portion 34 is continuously curved from the design surface 41 to the tapered surface 40 having a changing curvature as shown in FIG. 6, the slanting angle of the tapered surface 40 is an angle θ of a portion having the smallest angle to the wheel axis direction A.

Figure 6:
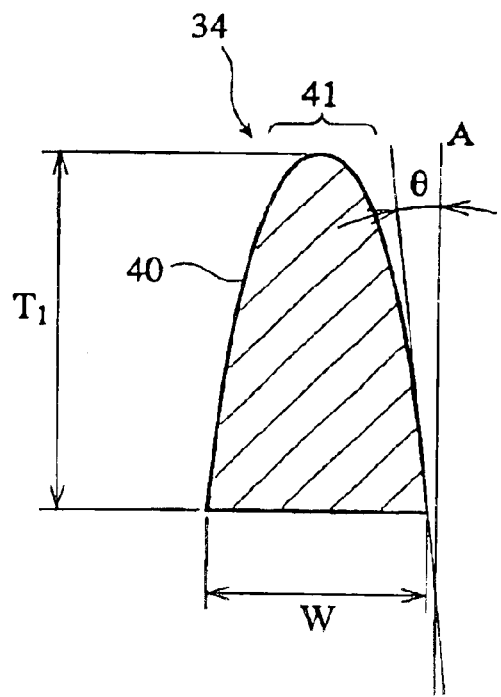
FIG. 6 is a partial cross-sectional view showing a further example of a tapered surface of the spoke portion.

In an embodiment shown in FIGS. 4-6, the tapered surface 40 of the spoke portion 34 is formed by a die for forming a front side of the design portion, though it may be formed by a die for forming a rear side. In the latter case, the spoke portion 34 has a reverse taper that is wide on the design surface and becomes narrower toward a deeper side.

In view of the fact that all tapered surfaces do not necessarily have the same slanting angle, a percentage of the tapered surface having a slanting angle of less than 5° is defined by a ratio (%) of the contour length of the tapered surface having that slanting angle to the contour length of the entire spoke portion. For instance, in a wheel shown in FIG. 1 having a plurality of spoke portions 34 each in the form of a Y-shaped ridge on the design surface, it is assumed that the Y-shaped ridge of each spoke portion 34 has a taper angle of 5° or more on an inside surface and a taper angle of less than 5° on an outside surface. If the total length of the inside surface of the Y-shaped ridge is 144 mm, and if the total length of the outside surface of the Y-shaped ridge is 240 mm, then a percentage of the tapered surface having a slanting angle of less than 5° is [240/(240+144)]×100= 62.5%.

Because the spoke portion does not have the same thickness from the hub portion to the rim portion, and because it has a complicated shape, there are a portion having a taper angle of less than 5.0° and a portion having a taper angle of 5.0° or more on the design surface. Accordingly, each spoke portion does not have a constant width W at a base. Thus, the minimum value of the width W at a base is defined as a minimum width $W_{min}$ of the spoke portion. The spoke portion 34 giving sharp impression preferably has a taper angle of less than 5.0° and a minimum width $W_{min}$ of 5 mm or less.

Of course, the flow of a melt is poor in the spoke portions 34 having small cross sections, resulting in high likelihood of casting defects. When the spoke portions have taper angles of less than 5.0° and a minimum width $W_{min}$ of 5 mm or less, the flow of a melt is poor in the spoke portions in a side gate method in which a sprue is provided only in a rim portion, or a center gate method in which a sprue is provided only in a disc portion, resulting in poor casting conditions and slow casting cycle.

With a side gate mounted onto a cavity portion corresponding to the rim portion and a center gate mounted onto a cavity portion corresponding to the disc portion, it is easy to cast a wheel having spoke portions with taper angles of less than 5.0° and a minimum width $W_{min}$ of 5 mm or less. The location of the side gate above the cavity portion corresponding to the disc portion is preferable, because there is no boundary between a melt from the center gate and a melt from the side gate on the disc portion (spoke portions). In the spoke portion 34 free from a dent portion as shown in FIGS. 4-6, the spoke portion 34 can have a minimum width $W_{min}$ of 4 mm or less and a height $T_1$ of 25 mm or more even with a taper angle of less than 5°.

Figure 7:
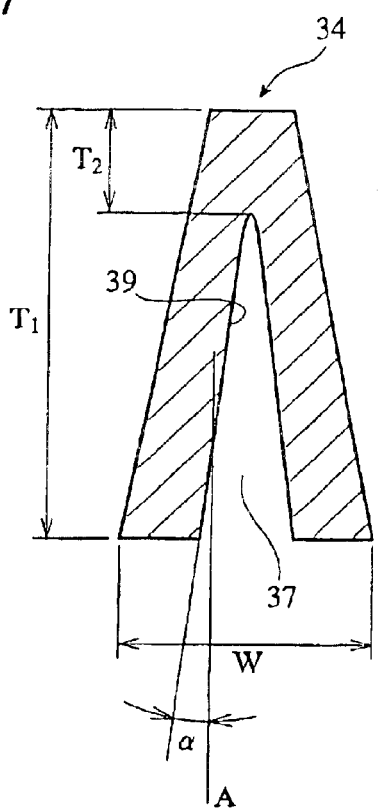
FIG. 7 is a partial cross-sectional view showing one example of a tapered surface of the dent portion of the spoke portion.
Figure 8:
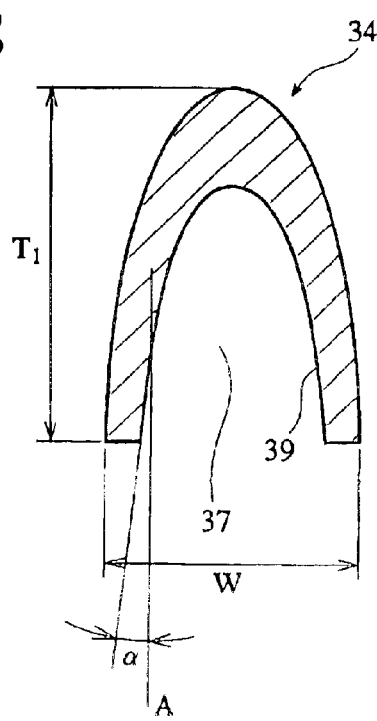
FIG. 8 is a partial cross-sectional view showing another example of a tapered surface of the dent portion of the spoke portion.
Figure 9:
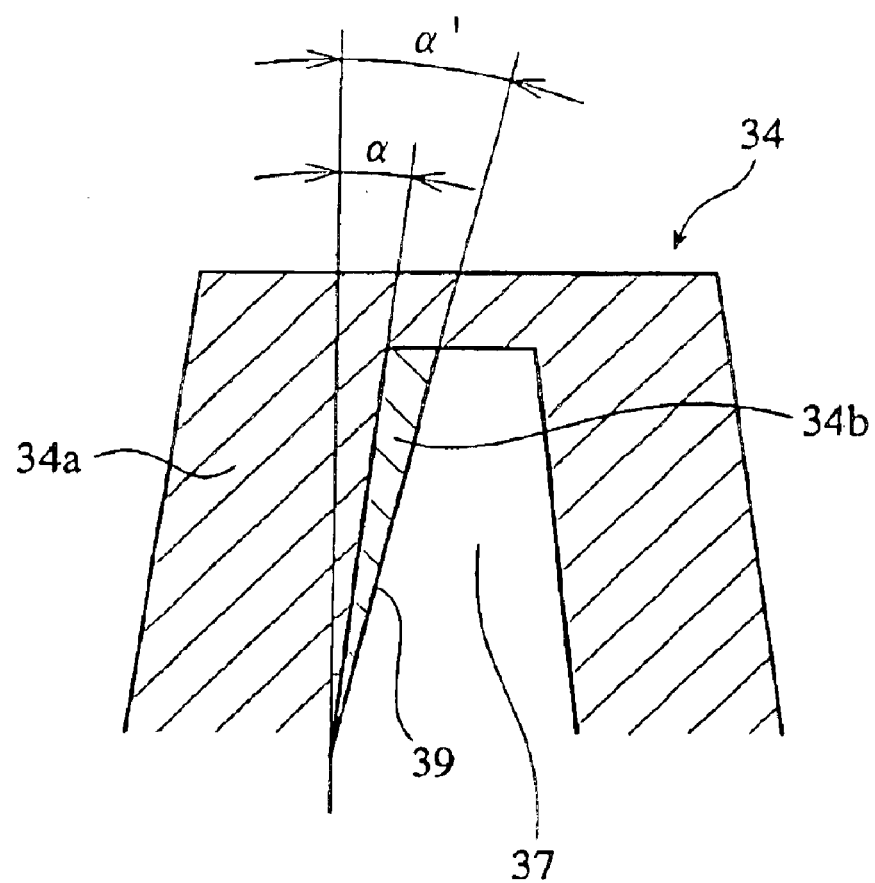
FIG. 9 is a schematic view showing the relation between slanting and thickness in the tapered surface of the dent portion of the spoke portion.

The slanting angle of the tapered surface 39 of the dent portion 37 is indicated by α in FIGS. 7 and 8. For instance, when the tapered surface 39 of the dent portion 37 provided in the spoke portion 34 has a constant slanting angle as shown in FIG. 7, the taper angle α of the dent portion 37 is an angle of the tapered surface 39 to a wheel axis direction A. Also, when the dent portion 37 has a curved surface as shown in FIG. 8, the taper angle α of the dent portion 37 is an angle of a portion having the minimum angle to the wheel axis direction A. Even if the dent portion 37 is provided on the rear side of the spoke portion 34, the spoke portion 34 can have a minimum width $W_{min}$ of 4.5 mm or less, a height $T_1$ of 30 mm or more, and a ceiling thickness $T_2$ of 5 mm or less, preferably 4 mm or less.

To cast a wheel having spoke portions 34 with small taper angles θ (when there are dent portions 37, their taper angles α are also small) without defects, not only should the arrangement of a sprue be changed, but also strict die operation control is needed at the time of withdrawing the solidified wheel from the die. Used for this purpose is a parallel-controlled driving apparatus such as hydraulic pressure cylinders for synchronously pushing the movable platen 14 up at three or more symmetric points to open a lower die 8 or an upper die 12 forming the disc portion from the other die.

Figure 10A:
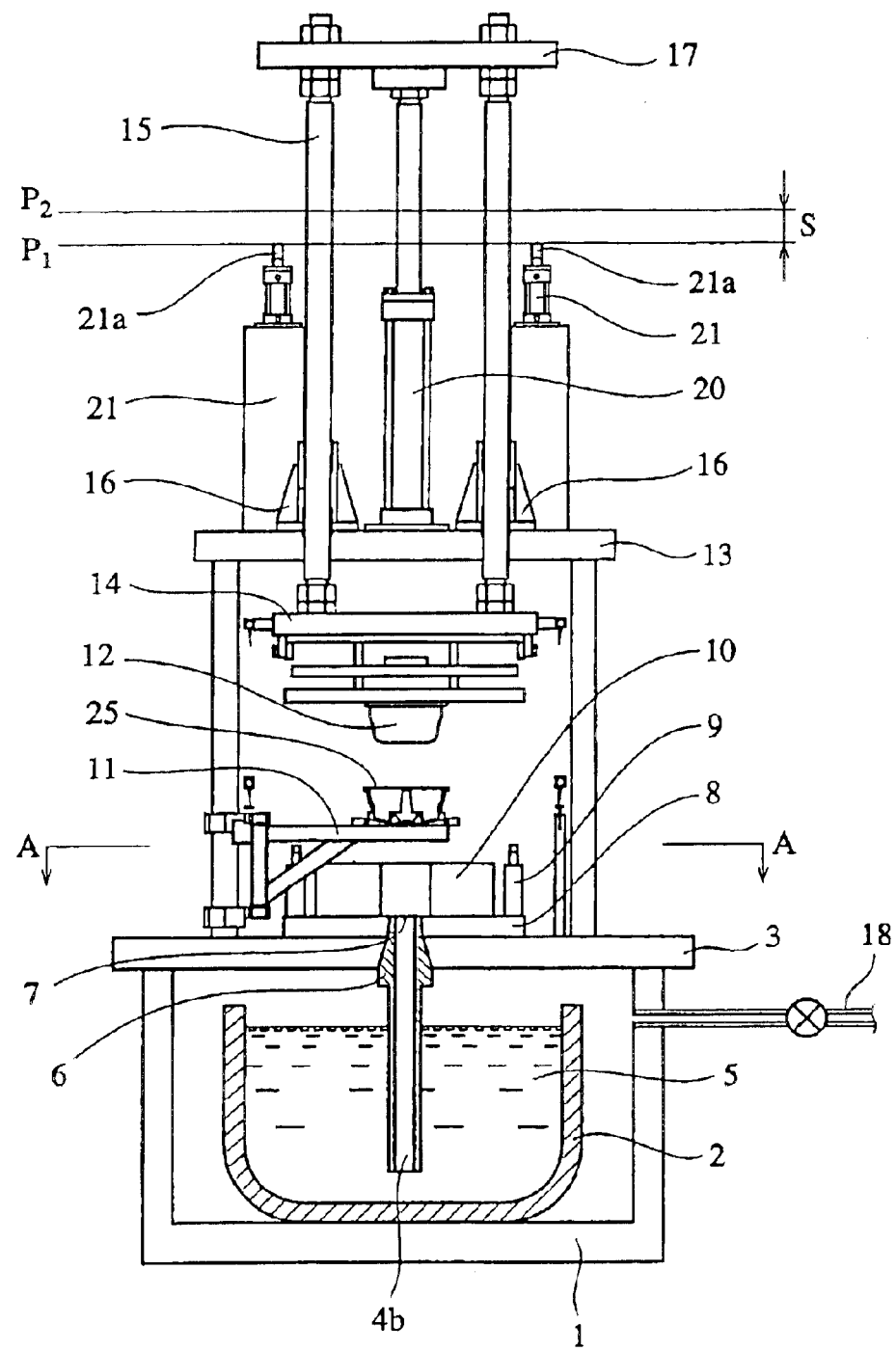
FIG. 10($a$) is a schematic view showing one example of apparatuses for casting light alloy wheels for vehicles according to the present invention, wherein an upper die has moved up to the highest position.
Figure 10B:
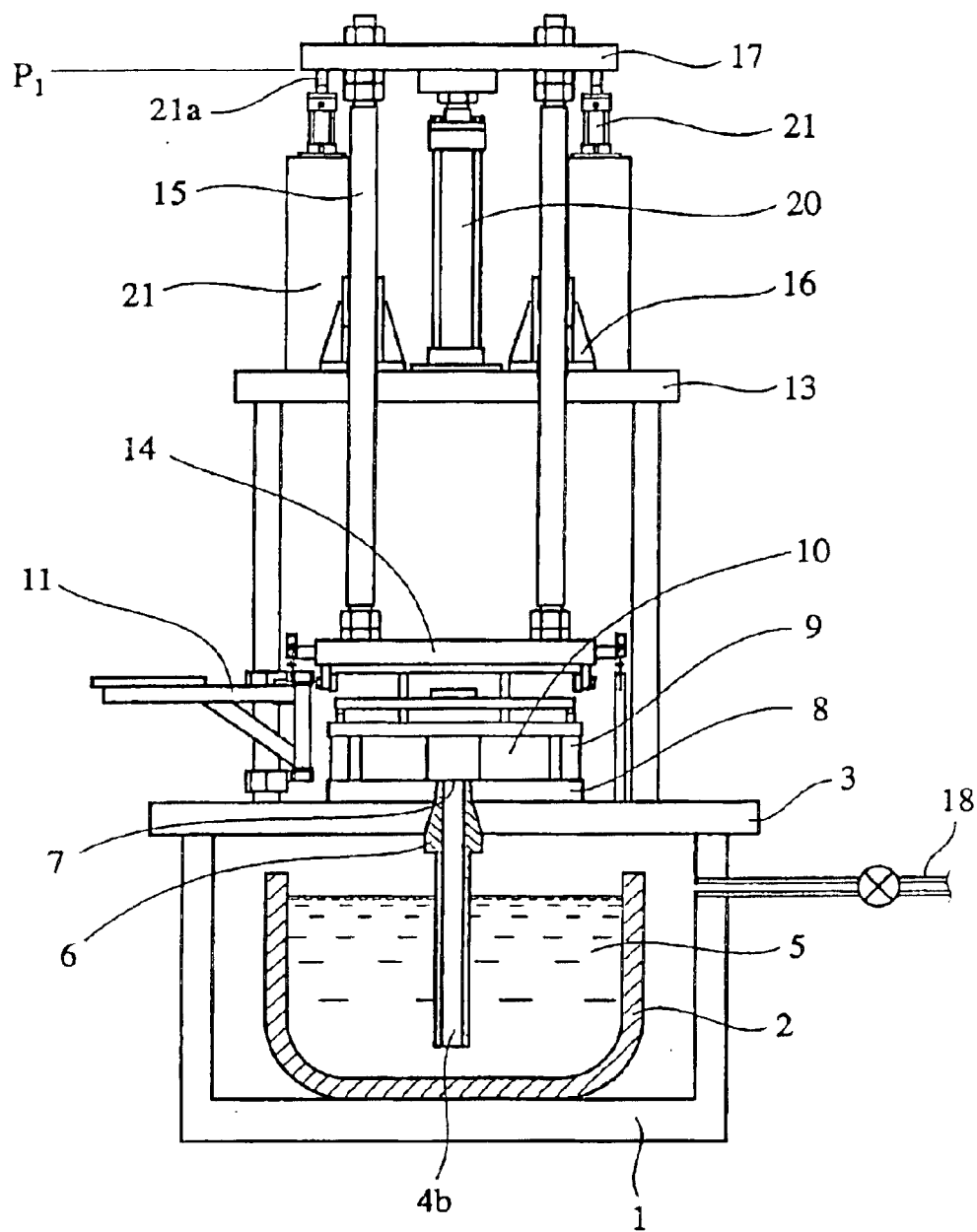
Figure 10C:
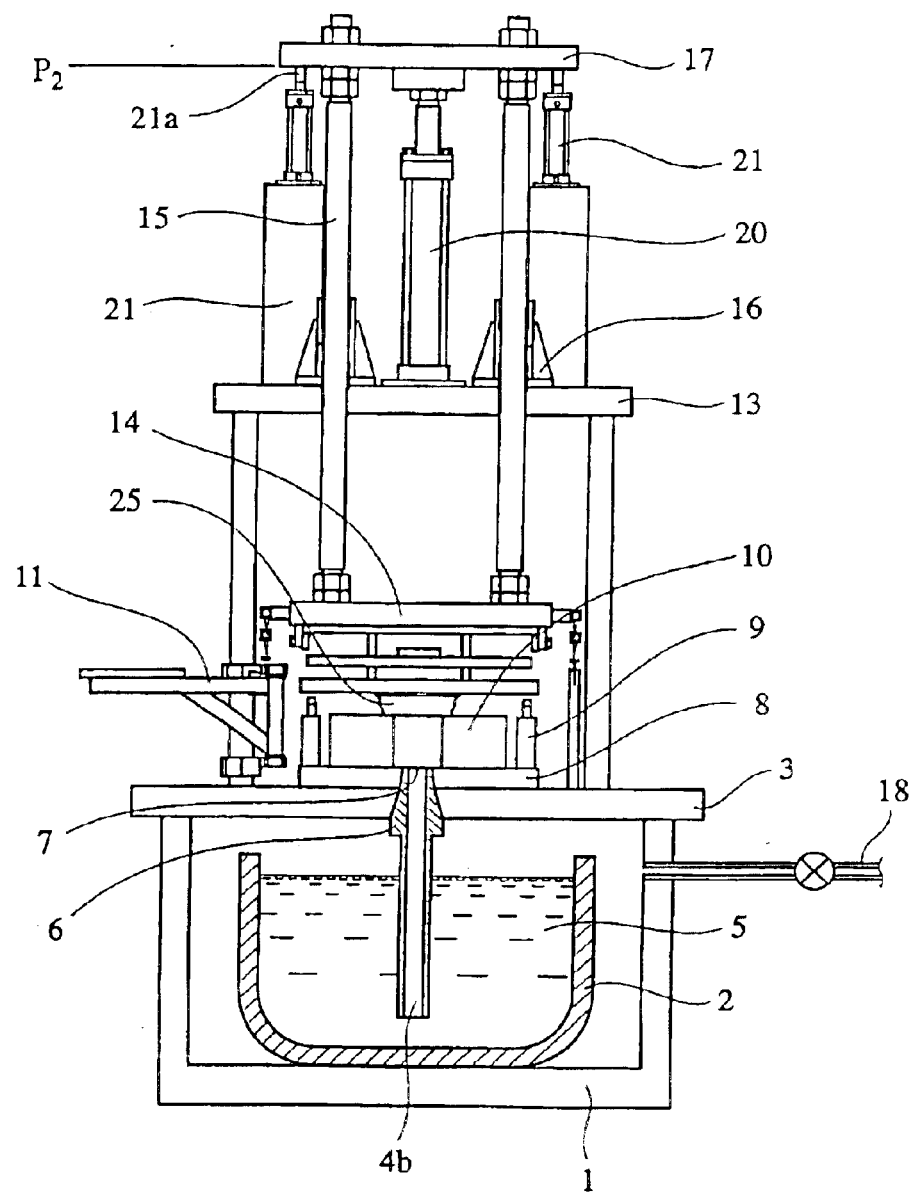

In a preferred embodiment shown in FIGS. 10(a)-(c) and FIGS. 11(a) and (b), the upper plate 17 is elevated in parallel by four synchronous cylinders 21 fixed to the upper platen 13 from the lowermost position [FIG. 10(b)] to a position $P_2$ as high as about 20–30 mm therefrom [FIG. 10(c)]. Alternatively, 3 or more synchronous cylinders may be mounted onto the lower platen 3 to directly elevate the movable platen 14 in parallel. With 2 or less synchronous cylinders, the movable platen 14 is likely to be slanted, making it difficult to cast wheels with small taper angles.

Because the lower platen 3 is more expanded thermally than the upper platen 13 by the melt-holding furnace provided near the lower platen 3, there should be a clearance of about 0.3–0.5 mm between the guides 16 and the guide posts 15. However, when only one hydraulic pressure cylinder 20 is used to elevate the movable platen 14 to open the die assembly, the movable platen 14 may be slanted during elevation because of this clearance if there is vibration in the casting apparatus. With the spoke portions and the hub portion having tapered surfaces with slanting angles of 6.0–8.0°, the cast wheel can be separated from the die without deterioration of its appearance even if the movable platen 14 is slanted. However, in the cast wheel having taper angles of less than 5°, scratch is likely to be caused in the spoke portions and the hub portion.

To prevent the cast wheel from being damaged at the time of opening the die assembly, it is important to suppress vibration applied to the die as much as possible and to control the elevation of the movable platen 14 fixed to the upper die 12.

(1) Suppression of Vibration on Die

In general, the upper die 12 pushes the lower die 8 at a die-clamping force of about 200 KN. This die-clamping force corresponds to a piston-lowering hydraulic pressure of the first hydraulic cylinder 20 of about 10 MPa. When the piston-lowering hydraulic pressure is reduced from 10 MPa to 0 MPa in less than 0.01 seconds, the strain of the casting apparatus by stress is instantaneously liberated, thereby generating surge pressure in a hydraulic pressure circuit. As a result, the entire casting apparatus is vibrated, failing to elevate the movable platen 14 in parallel to the lower die 8 without synchronous hydraulic cylinders, and causing the upper die 12 to deviate in a transverse direction, resulting in scratch on the design surface by the lower die 8.

In general, a hydraulic cylinder is driven by a hydraulic pressure for elevating a piston and a hydraulic pressure for lowering a piston. In the case of the first hydraulic cylinder 20, a piston-lowering hydraulic pressure decreases while applying a constant piston-elevating hydraulic pressure to reduce a die-clamping force to zero to open a die assembly. Assuming that a time period in which a valve for a piston-lowering hydraulic pressure is fully opened is about 0.02 seconds, it takes about two times or more until the piston-lowering hydraulic pressure becomes 0 MPa. Accordingly, by reducing the piston-lowering hydraulic pressure of the first cylinder to zero over as long a time period as 0.05 seconds or more, preferably 0.1 seconds or more, it is possible to prevent the casting apparatus from being subjected to impact by rapid decrease in a hydraulic pressure, thereby casting a wheel having a design surface free from scratch. Conventional valves for hydraulic cylinders cannot control the slow reduction of the die-clamping force to zero, and a hydraulic flow-proportional control valve and an electromagnetic valve are preferably used for accurate control.

Also, a die-clamping force is preferably elevated slowly, so that vibration and stress exceeding the permitted levels are not applied at the time of die clamping. Rapid die clamping generates vibration in the overall casting apparatus. Because the total weight of the movable platen 14, the lower die 8, etc. is 3–4 tons, strain of about 1 mm is caused by stress in the upper platen 13 and the lower platen 3 in a vertical direction. Also, because the die clamping has influence in a parallel direction, the die clamping is preferably carried out at such a speed as not to generate strain in the production of an aluminum wheel having spoke portions with small taper angles. For this purpose, too, a hydraulic flow-proportional control valve and an electromagnetic valve are preferably used.

(2) Control of Elevation of Movable Platen

At the time of separating from the lower die 8, the cast wheel is as hot as 400–450° C. with small strength. Particularly when it has a design surface having a complicated shape, it is not easily separated from the lower die 8, and it has weak strength in a separating direction. Unless the cast wheel is elevated smoothly in a vertical direction, its design portion is scratched. Therefore, the control of the elevation of the movable platen 14 fixed to the upper die 12 is extremely important.

The distance in which the upper die 12 should be elevated completely in parallel to the lower die 8 is about 5–20 mm from the die-clamping position. Above it, the design surface of a wheel would not impinge on the lower die 8 even if the movable platen 14 were slanted to some extent. To elevate the movable platen 14 with strict control to such an extent, it is preferable that the upper die 12 or the movable platen 14 fixed to the upper die 12 is elevated in parallel synchronously at 3 or more points. For this purpose, it is effective to use four synchronous vertical cylinders arranged symmetrically. An electric current control valve and a servo valve may be used to drive the synchronous cylinders.

It is also important that the elevating speed of the movable platen 14 is 10 mm/second or less from the die-clamping position to a height of 5 mm or more, preferably 10 mm or more. Because the design surface of the wheel is in full contact with the lower die 8 at the die-clamping position, the slightest vibration would cause scratch on the design surface. Though there would be no problem with scratch if the entire design surface were worked after casting. However, if wheels are used with as-cast design surfaces, the slightest scratch would make such wheels defective products.

Particularly when the spoke portions have small taper angles, this problem is serious. For instance, if impact is given to the casting apparatus at a position at which there is only a distance of less than 5 mm between the die and the design surface of the wheel, the design surface of the wheel is scratched even with as slight transverse deviation of the die as 0.5 mm, because 5 mm×tan 5°=0.5 mm. In the casting apparatus shown in FIGS. 10(a)-(c), it is sometimes difficult to avoid the transverse deviation of the die only with a clearance between the guides 16 and the guide posts 15. Accordingly, it is preferable to separate the cast product from the die at such a low speed as not to give vibration until the cast product reaches a predetermined elevation position. Of course, for a smaller taper angle of the spoke portion, the elevating speed of the movable platen 14 is preferably smaller. For this purpose, the elevating speed of the movable platen 14 is preferably changeable depending on the elevation distance thereof.

Also, by optimizing the casting method and the cooling structure, a wheel can be cast such that it has spoke portions, at least part of which have a DAS (dendrite arm spacing) value of less than 30 $\mu$m. Because dendrite grows to have secondary arms on both sides of its stem in aluminum alloys, the DAS value can be determined by measuring distances between the secondary arms.

The fact that the DAS value is less than 30 $\mu$m means that a melt was cooled rapidly in the spoke portions, resulting in a wheel with few casting defects. This makes it possible to apply coating technologies such as vapor deposition and plating. When the DAS value is large, fine pores are generated on the surfaces of spoke portions in vapor deposition and plating due to casting defects, resulting in poor wheel appearance. The DAS value is also a measure of the strength of aluminum castings, indicating that the smaller the DAS value, the higher the strength of aluminum castings.

In 50% or more, preferably 80% or more, most preferably 100% of the entire spoke portions, the DAS value can be less than 30 $\mu$m. In the present invention, the spoke portions have a small DAS value, because the spoke portions have small cross sections with taper angles of less than 5°. Because the spoke portions are narrow and small in cross section, the cooling speed of the spoke portions are high. Accordingly, it is possible to obtain an integral cast wheel having thin, high-strength spokes.

To accelerate the cooling speed, a die portion corresponding to the hub portion is provided with a cooling structure, resulting in a remarkably smaller DAS value in the hub portion than those conventional. Because a melt temperature is high near a center gate, a die-parting coat easily peels off, resulting in likelihood of galling by the melt. Galling by the melt can drastically be suppressed by cooling the die portion corresponding to the hub portion, accompanied by improvement in the strength of the hub portion. Thus, a light alloy wheel can be obtained with spoke portions having at least partially taper angles of less than 5.0° and with a DAS value in the hub portion smaller than the maximum DAS value in the rim portion. The resultant light alloy wheel has dent portions at least partially having taper angles of less than 5.0°. Incidentally, because there is a sprue in the hub portion, the DAS value of the hub portion is measured after finish working.

When this portion is cooled in a center gate method, a melt is solidified first in the hub portion, resulting in insufficient feeding effect in the rim portion. Because the disc portion is distant from a sprue in a side gate method, a melt does not flow well in cavity portions corresponding to thin spoke portions. When an aluminum wheel is integrally cast by a multi-gate method in which a gate for a melt is provided in each cavity portion for forming the hub portion and the rim portion, directional solidification for enhancing the feeding effect is easily achieved in combination with a cooling mechanism for the other portion, even if cooling is carried out near the hub portion. Because the feeding effect for preventing shrinkage cavity in the spoke portions is obtained to some extent by pressure from a side gate, a cooling mechanism can be provided in the hub portion without generating casting defects, thereby making a casting cycle shorter and improving the strength of the hub portion in good balance. The hub portion is fixed to a vehicle body with bolts, needing enough strength. Because of a high cooling speed, the hub portion can be provided with sufficient strength, so that it can be thin and have reduced weight.

The light alloy wheel for a vehicle having the above features according to the present invention may be formed by casting not only aluminum alloys but also magnesium alloys, etc.

Specific examples of the light alloy wheel for a vehicle and the apparatus and method for producing such a light alloy wheel according to the present invention will be explained in detail below referring to the attached drawings, with the same reference numbers allocated to common parts in the specific examples.

EXAMPLE 1

FIGS. 10(a)-(c) schematically show an apparatus for integrally casting a wheel made of an aluminum alloy as a light alloy wheel for a vehicle of the present invention by a low-pressure casting method. A closed container 1 includes a melt-holding furnace 2, and a lower platen 3 arranged above the closed container 1 seals the closed container 1. Mounted onto the lower platen 3 at its center is a stoke 4b for supplying an aluminum alloy melt 5 to a stationary lower die 8, with an lower end of the stoke 4b immersed in the melt 5 in the melt-holding furnace 2. The stoke 4b extends through the lower platen 3 and a sprue bush 6 inserted into the lower die 8, with an upper end of the stoke 4b connected to a sprue 7 in the lower die 8. The melt in the melt-holding furnace 2 flows through the stoke 4b into a cavity of the lower die 8 for forming a wheel at a position corresponding to a hub portion.

Figure 11A:
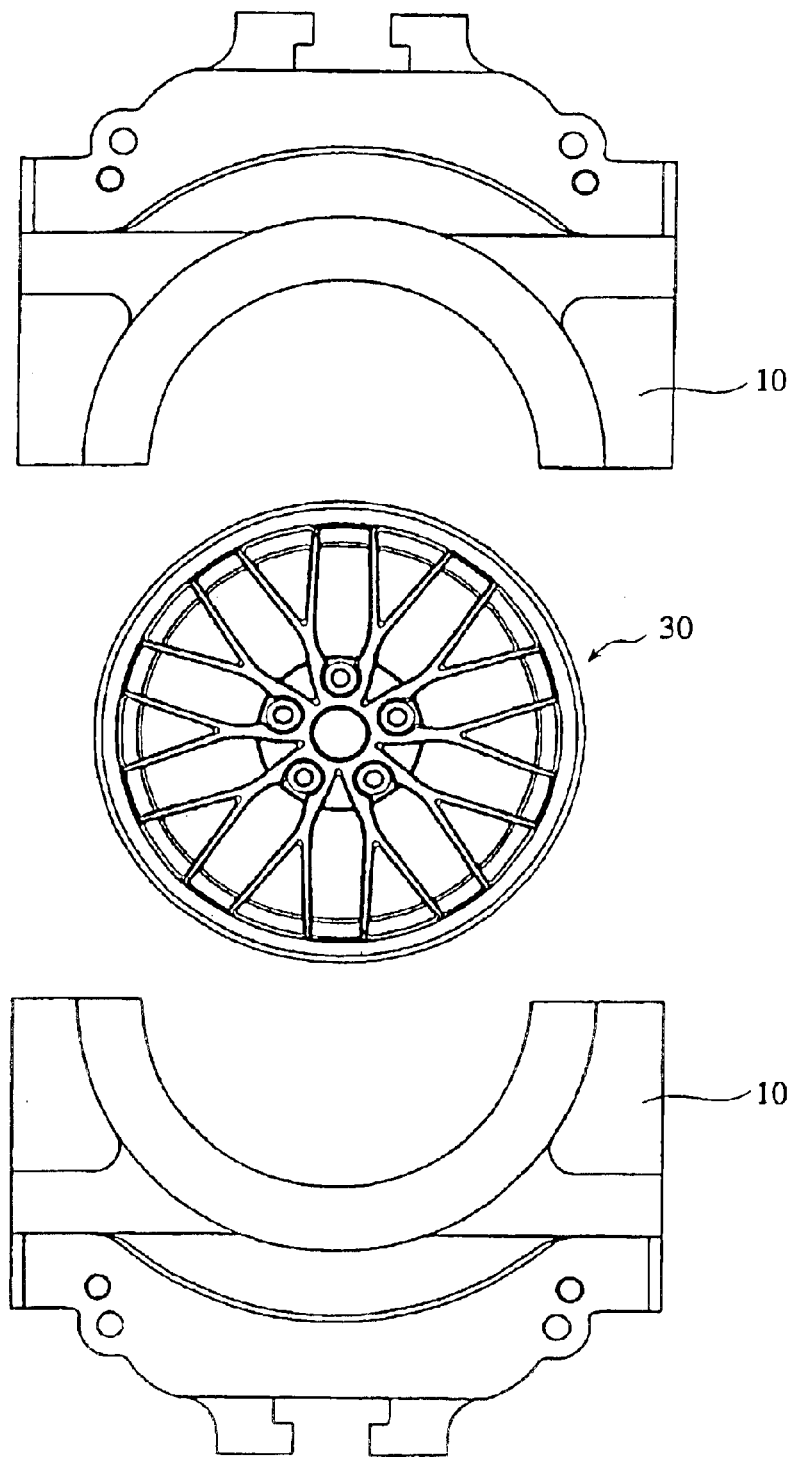
FIG. 11($a$) is a cross-sectional view taken along the line A—A in FIG. 10($a$), in which transverse movable dies are open.
Figure 11B:
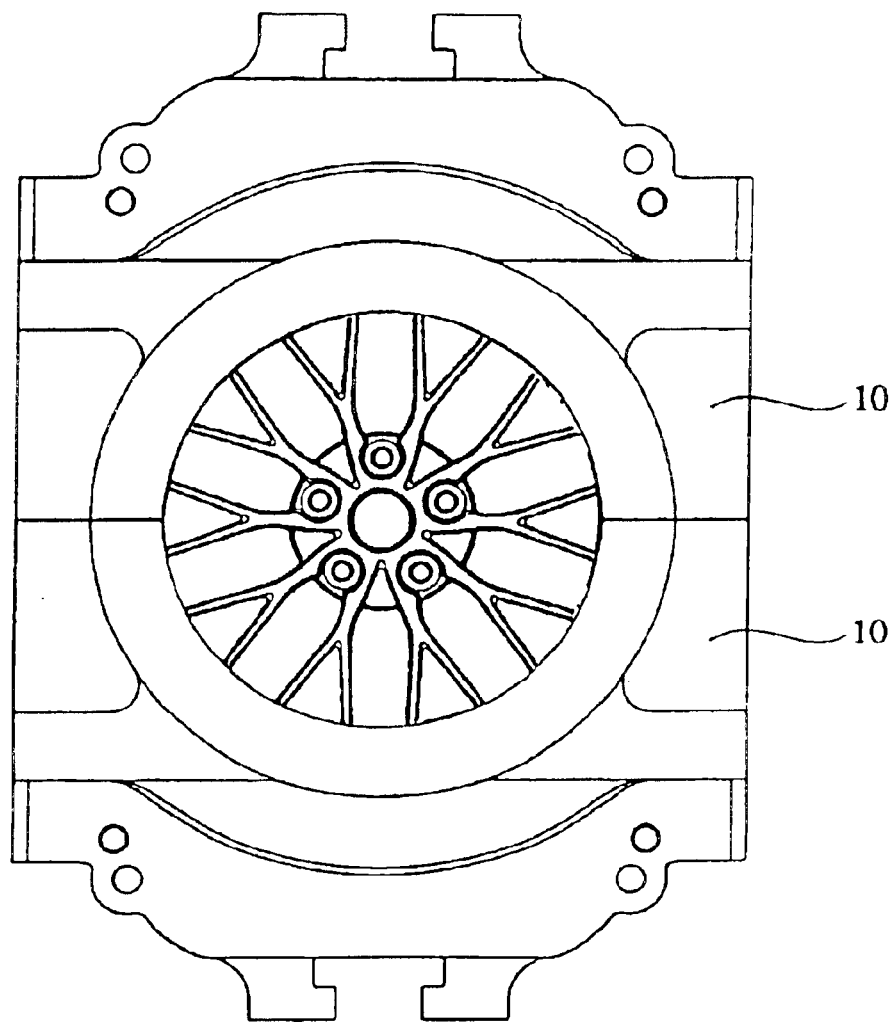

The stationary lower die 8 has a surface for forming a design portion of the wheel. In this EXAMPLE, the minimum slanting angle of a tapered surface was 3.5°, with a dent portion on the rear side of the spoke portion as shown in FIG. 7. Also, a height $T_1$ was 30 mm, a minimum width $W_{min}$ was 40 mm, and a ceiling thickness $T_2$ was 10 mm. As shown in FIGS. 11(a) and (b), a pair of transversely movable dies 10, 10 combined with the lower die 8 form a peripheral surface of a rim portion of the wheel. The movable upper die 12 mounted onto the movable platen 14 forms a rear surface of the wheel and an inner surface of the rim portion.

The movable platen 14 is fixed to two guide posts 15, which are movable up and down along guides 16 mounted onto the upper platen 13. An upper plate 17 is fixed to upper ends of the guide posts 15, and movable up and down by a first hydraulic cylinder 20 mounted onto the upper platen 13, whereby the movable platen 14 and the upper die 12 are movable up and down. FIG. 10(b) shows a state where the upper plate 17 has reached the lowermost position $P_1$. This lowermost position $P_1$ is a position at which the upper die 12 is clamped to the transversely movable dies 10 and the lower die 8.

Fixed to an upper surface of the upper platen 13 at symmetric positions are four second hydraulic cylinders 21. The four second hydraulic cylinders 21 are synchronously driven, such that upper ends of their pistons 21a are movable from a die-clamping position $P_1$ to a position $P_2$ at which the wheel would not impinge on the lower die 8 even if the movable platen 14 were slanted. With the synchronous elevation of the four second hydraulic cylinders 21 between the position $P_1$ and the position $P_2$, the movable platen 14 is elevated sufficiently in parallel. During the movement of the second hydraulic cylinders 21 in a stroke S, the first hydraulic cylinder 20 is in a neutral state. After the pistons 21a has reached the position $P_2$, the first hydraulic cylinder 20 is driven to elevate the upper plate 17 to the uppermost end.

With the apparatus shown in FIG. 10, the casting of a wheel was carried out by the following procedures. In this EXAMPLE, the piston-lowering hydraulic pressure of the first hydraulic cylinder 20 was slowly reduced without using the second hydraulic cylinders 21, to prevent vibration from occurring in the casting apparatus.

First, as shown in FIG. 10(b), the first hydraulic cylinder 20 was lowered to cause the upper die 12 to come into contact with the lower die 8 and the transversely movable dies 10, so that the die assembly was clamped at a pressure of 10 MPa. Thereafter, a compressed gas such as the air, an inert gas, etc. at 0.02–0.05 MPa was introduced into the closed container 1 through a pipe 18. With the compressed gas, the melt 5 of aluminum (AC4CH) kept at about 700° C. in the melt-holding furnace 2 was lifted in the stoke 4b, so that it entered into the cavity of the die assembly kept at 350–450° C. An inner surface of the cavity was covered with a temperature-keeping, die-parting coating material.

After about 2–3 minutes from the injection of the melt, the compressed air was evacuated, and an unsolidified melt 5 in the stoke 4 was returned to the melt-holding furnace 2. After the solidification of the melt in the die cavity was completed, and after the temperature lowered to about 400–450° C., the clamping force of the die assembly was reduced to 0 MPa.

Because the cast wheel 25 remained attached to the upper die 12, the upper die 12 was elevated as it was. By reducing the piston-lowering hydraulic pressure of the first hydraulic cylinder 20 from 10 MPa to 0 MPa in 0.1 seconds while keeping the piston-elevating hydraulic pressure of the first hydraulic cylinder 20 as constant as 2.5 MPa, the upper die 12 was slowly elevated. At a time when the upper die 12 was sufficiently elevated, the cast wheel 25 was removed from the upper die 12 by pushing pins (not shown) fixed to the upper platen 13, and received on a withdrawal member 11 rotated to a position just thereunder [FIG. 10(a)]. This cycle was repeated to continuously cast a large number of aluminum wheels.

Figure 14:
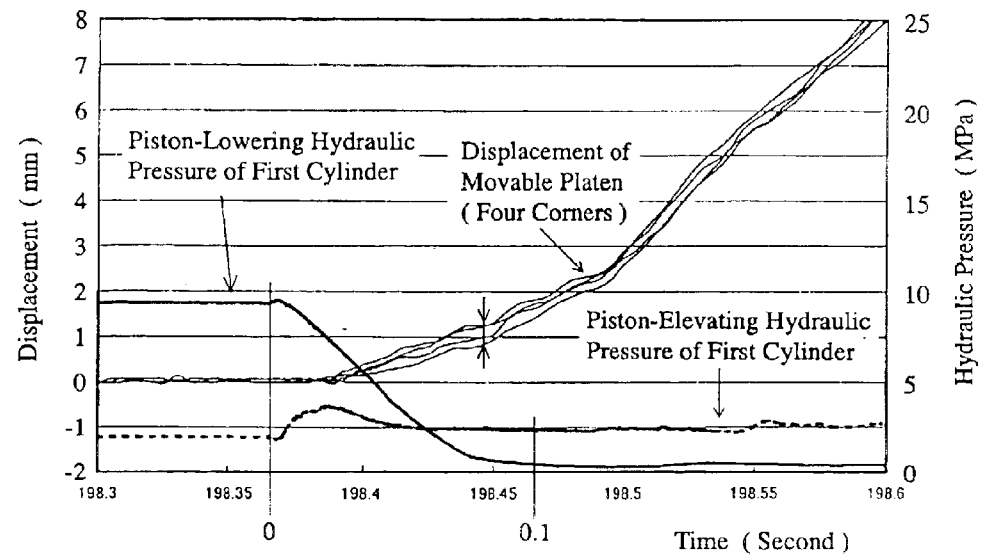
FIG. 14 is a graph showing the change of a piston-lowering hydraulic pressure and a piston-elevating hydraulic pressure of the first hydraulic cylinder, and the displacement of a platen, when the upper die is separated from the lower die to open the die assembly in EXAMPLE 1.

FIG. 14 shows the variations of the piston-lowering hydraulic pressure and the piston-elevating hydraulic pressure and the displacement of the movable platen 14, when the piston-lowering hydraulic pressure of the first hydraulic cylinder 20 was reduced from 10 MPa to 0 MPa in 0.1 seconds to lower the movable platen 14. In the figure, rightward elevating lines indicate the displacement of the movable platen 14 from the die-clamping position. The displacement of the movable platen 14 (1,780 mm×1,020 mm) was measured at four corners. With reflection-type lasers attached to the movable platen 14 at four corners in the casting apparatus shown in FIG. 10, measurement was carried out continuously at four points with precision of 0.05 mm from the die-clamping position to a position 80 mm elevated therefrom, to determine the parallelism of the movable platen 14 to the lower die 8 during elevation. In addition, the changes of the piston-lowering hydraulic pressure and the piston-elevating hydraulic pressure were continuously measured by a pressure sensor (maximum load: 20 MPa) attached to a connector port of the first cylinder 20, while the upper die 12 was clamped to and parted from the lower die 8.

As shown in FIG. 14, the piston-lowering hydraulic pressure of the first cylinder 20 decreased slowly in 0.1 seconds, without causing vibration in the casting apparatus. The movable platen 14 was elevated at a speed of 3 mm/second from the die-clamping position $P_1$ to a position $P_2$ of 5 mm.

Thus cast were 20 aluminum wheels having spoke portions, 50% or more of their taper angles θ being less than 5°, to observe whether or not there were scratch and deformation on their design surfaces. As a result, neither scratch nor deformation was observed on the design surfaces, confirming that every wheel was in a good shape.

EXAMPLE 2

Figure 12:
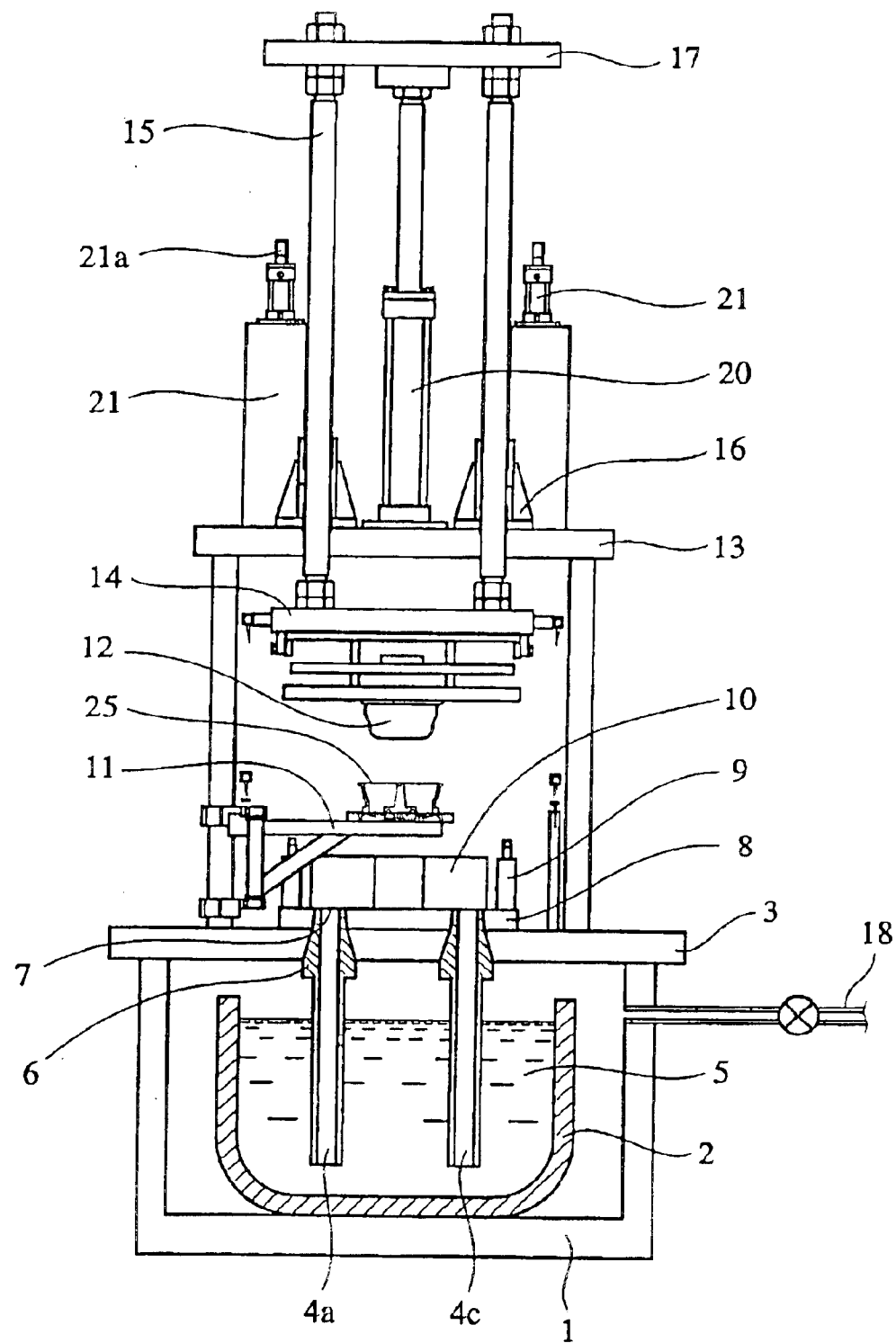
FIG. 12 is a schematic view showing another example of apparatuses for casting light alloy wheels for vehicles according to the present invention.

Aluminum wheels were cast in the same manner as in EXAMPLE 1 except for using a casting apparatus having a plurality of stokes 4a, 4c as shown in FIG. 12. In this EXAMPLE, a melt 5 flew through a lower die 8 into transversely movable dies 10, in which it flew into a cavity for forming a rim portion of a wheel. The melt 5 was caused to flow at some angle to the wheel axis direction of the cavity, such that the melt 5 entering through the stokes 4a, 4c easily flew in a peripheral direction of the rim. Thus, 20 aluminum wheels were cast to observe whether or not there were scratch and deformation on their design surfaces. As a result, neither scratch nor deformation was observed on the design surfaces, confirming that every wheel was in a good shape.

EXAMPLE 3

Figure 1:
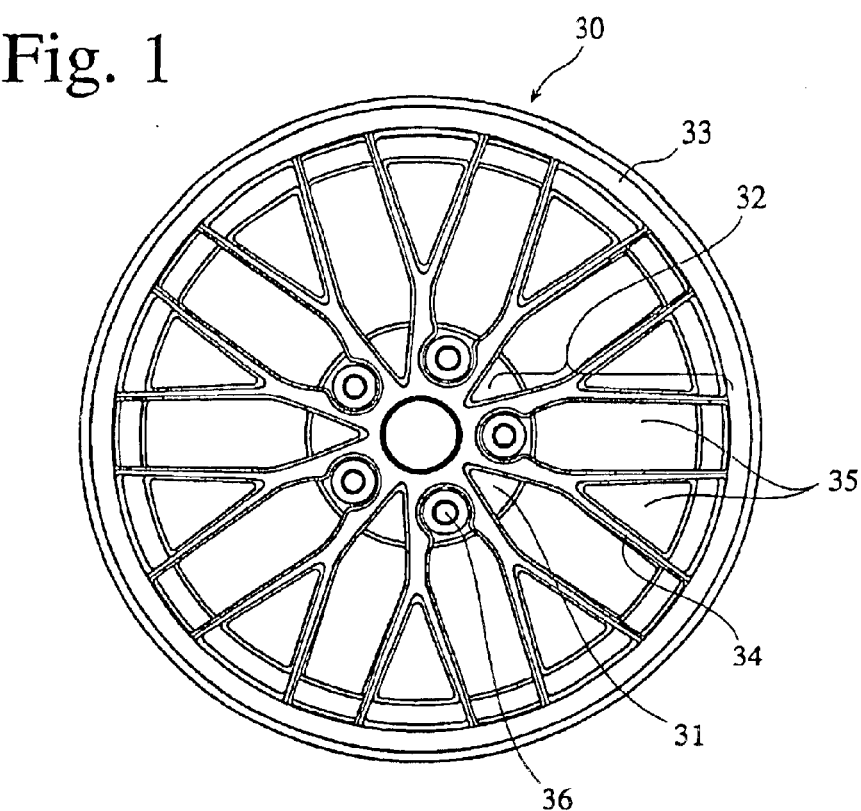
FIG. 1 is a front view showing a wheel according to one embodiment of the present invention.
Figure 13:
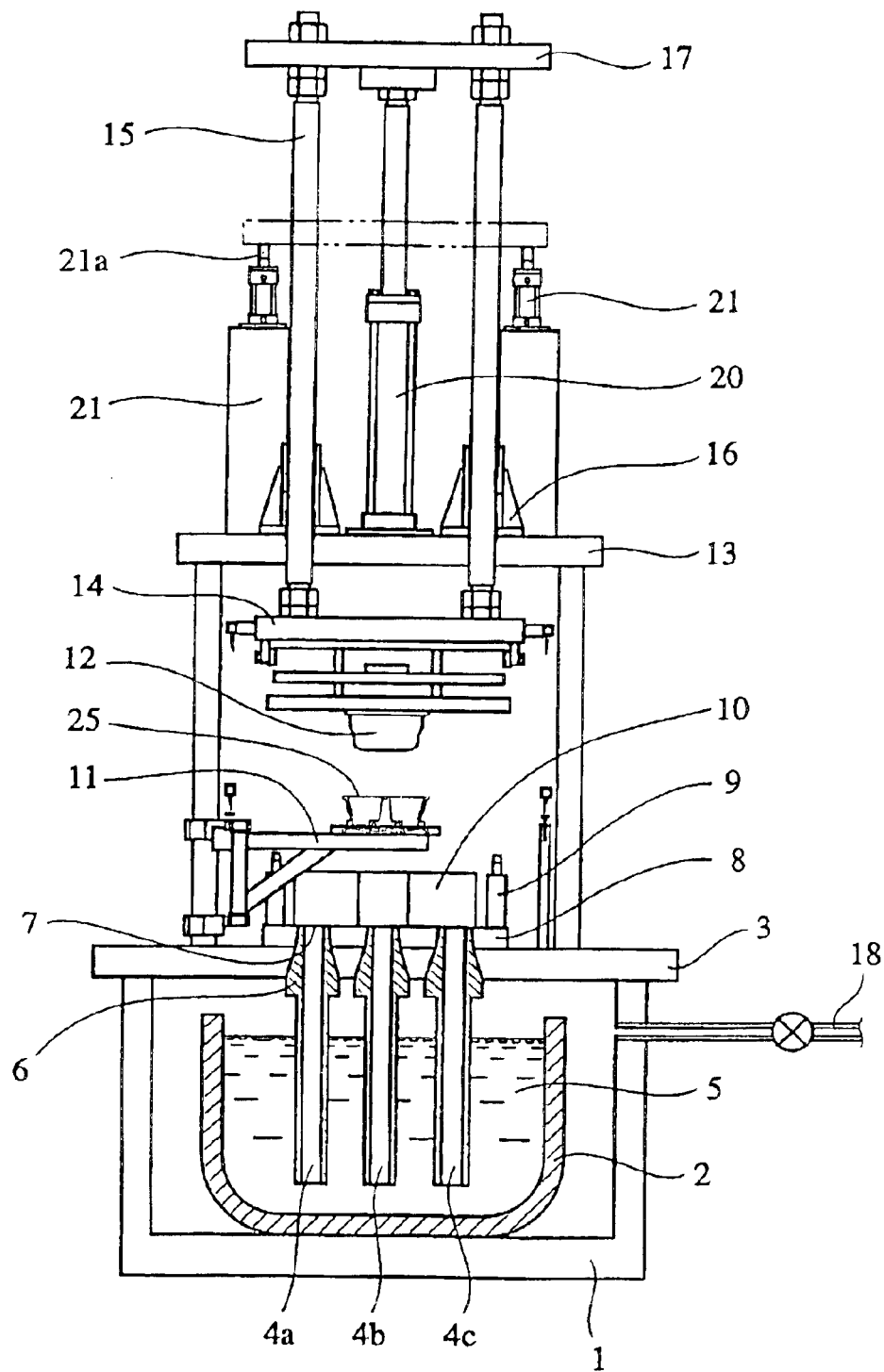
FIG. 13 is a schematic view showing a further example of apparatuses for casting light alloy wheels for vehicles according to the present invention.

Aluminum wheels each having a design surface shown in FIG. 1 was produced in the same manner as in EXAMPLE 1 except for using a casting apparatus having three stokes as shown in FIG. 13. One stoke was positioned such that a melt was injected into a cavity for forming a hub portion of a wheel as in EXAMPLE 1, and the remaining two stokes were positioned such that a melt flew into transversely movable dies 10 and then into a cavity for forming a rim portion of a wheel as in EXAMPLE 2. The shape of the lower die 8 was changed to have a taper angle θ of 3.5°, thereby providing each spoke portion with a cross section shape shown in FIG. 4. Also, a height $T_1$ was 30 mm, a minimum width $W_{min}$ was 40 mm, and 50% or more of a taper angle of the spoke portion was 3.5°. With other casting conditions identical to those of EXAMPLE 1, 20 aluminum wheels were produced. As a result, neither scratch nor deformation was observed on the design surfaces of the resultant aluminum wheels, confirming that every wheel was in a good shape.

EXAMPLE 4

Casting was carried out using a casting apparatus having three stokes as in EXAMPLE 3. The shapes of the lower die 8 and the upper die 12 were changed to provide each spoke portion with a cross section shape shown in FIG. 7. A taper angle θ on a design surface was 3.5°, and a taper angle α of the dent portion 37 on the rear side of the spoke portion was 5°. Each spoke portion had a height $T_1$ of 30 mm (substantially equal to a height of a tapered surface), a ceiling thickness $T_2$ of 5 mm, and a minimum width $W_{min}$ of 4.5 mm, the taper angle θ of the spoke portion being 3.5° in a 50% or more region of the spoke portion. With other casting conditions identical to those of EXAMPLE 1, 20 aluminum wheels were produced. As a result, neither scratch nor deformation was observed on the design surfaces of the resultant aluminum wheels, confirming that every wheel was in a good shape.

COMPARATIVE EXAMPLE 1

Figure 15:
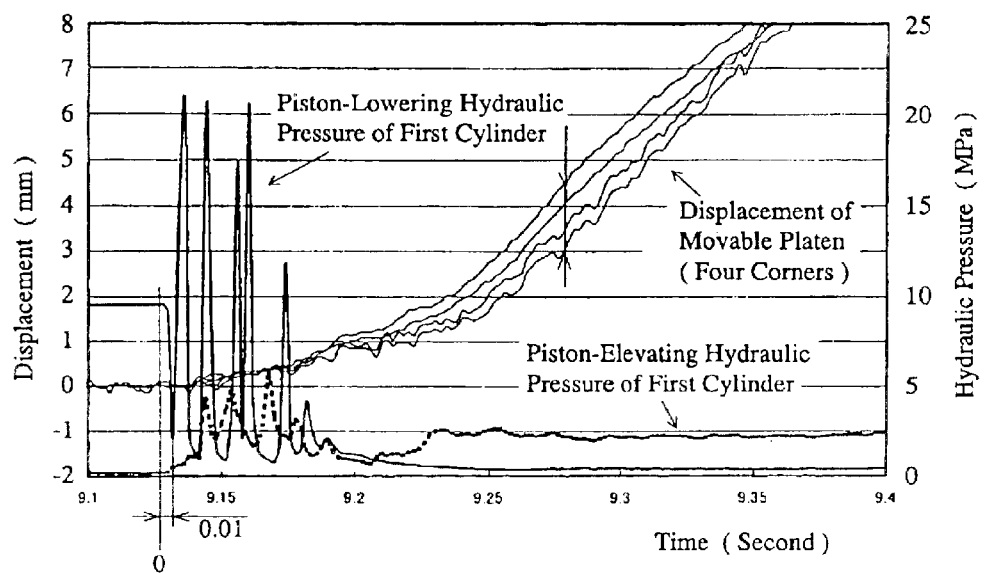
FIG. 15 is a graph showing the change of a piston-lowering hydraulic pressure and a piston-elevating hydraulic pressure of the first hydraulic cylinder, and the displacement of a platen, when the upper die is separated from the lower die to open the die assembly in COMPARATIVE EXAMPLE 1.

With the same casting apparatus as shown in FIG. 10 except for having no second hydraulic cylinder 21, the piston-lowering hydraulic pressure of a first hydraulic cylinder 20 was reduced from 10 MPa to 0 MPa in 0.01 seconds. FIG. 15 shows the variations of the piston-lowering hydraulic pressure and the piston-elevating hydraulic pressure and the displacement of the movable platen 14 in this case. Other casting conditions and measurement method were identical to those of EXAMPLE 1.

As shown in FIG. 15, the piston-lowering hydraulic pressure of the first hydraulic cylinder 20 for lowering the movable platen 14 rapidly decreased, followed by large variations about 5 times. The variations disappeared after about 0.1 seconds from the start of reduction of the piston-lowering hydraulic pressure. It was found that because of these large variations the movable platen 14 was slanted, and that it was elevated while being slanted relative to the lower die 8. It was confirmed that the maximum displacement of the movable platen 14 at each corner took place at a position of about 3–5 mm elevation, with the maximum displacement difference of about 1.5 mm.

All of 20 aluminum wheels thus cast to have the same shape as in EXAMPLE 1 suffered from scratch and deformation more or less on the design surface.

EXAMPLE 5

With a casting apparatus having four second hydraulic cylinders 21 on the upper platen 13 as shown in FIG. 10, the piston-lowering hydraulic pressure of the first hydraulic cylinder 20 was first reduced from 10 MPa to 0 MPa in 0.01 seconds as in COMPARATIVE EXAMPLE 1, and the second hydraulic cylinders 21 were then synchronously driven to elevate the upper plate 17 in parallel from the lowermost position $P_1$ to a position $P_2$ as high as about 20–30 mm therefrom. Also, with guide pins of 20 mm in height provided between the upper die 12 and the lower die 8, both dies 8, 12 were prevented from moving in a relatively horizontal direction.

With the upper die 12 elevated under the above conditions, the variations of the piston-lowering hydraulic pressure of the first hydraulic cylinder 20 and the displacement of the movable platen 14 were measured. As a result, though the variations of the piston-lowering hydraulic pressure were on the same level as in COMPARATIVE EXAMPLE 1, the movable platen 14 was displaced substantially constantly. It was confirmed from this that the movable platen 14 could be elevated while being kept in parallel from the lower die 8 to the position $P_2$ by four synchronous second hydraulic cylinders 21.

EXAMPLE 6

Aluminum wheels were cast in the same manner as in EXAMPLE 3 except for using a lower die 8 having a hub portion provided with bolt hole recesses 36 each having a taper angle of 4° and depth of 20 mm. As a result, no scratch was observed in the bolt hole recesses, providing wheels with good cast surface.

EXAMPLE 7

Figure 2:
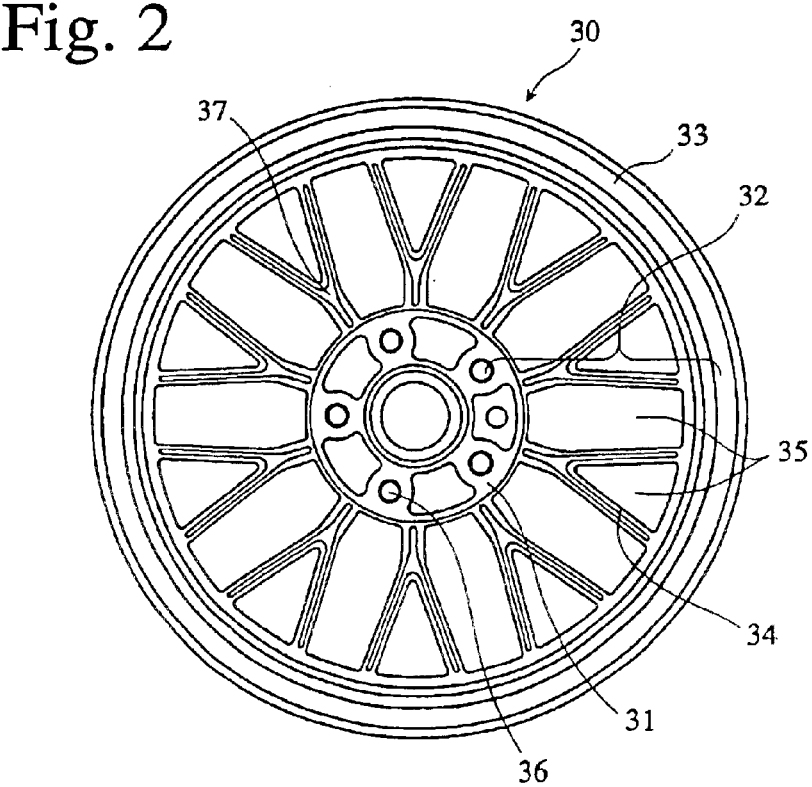
FIG. 2 is a rear view showing a wheel according to one embodiment of the present invention.

Casting was carried out using a die having dent portions having taper angles α of 3.5° and spoke portions with a cross section shape shown in FIG. 8 in the casting apparatus shown in FIG. 13. The tapered surfaces of the spoke portions had a height $T_1$ of 30 mm or more, a ceiling thickness $T_2$ of 5 mm or less, and a minimum width $W_{min}$ of 4.5 mm or less, 50% or more of the taper angles α of the tapered surfaces in the dent portions being 3.5°. With other casting conditions identical to those of EXAMPLE 3, 20 aluminum wheels were produced. FIG. 2 shows a rear surface of the wheel. Neither scratch nor deformation was observed on the design surfaces of the resultant aluminum wheels, confirming that every wheel was in a good shape.

EXAMPLE 8

Figure 3:
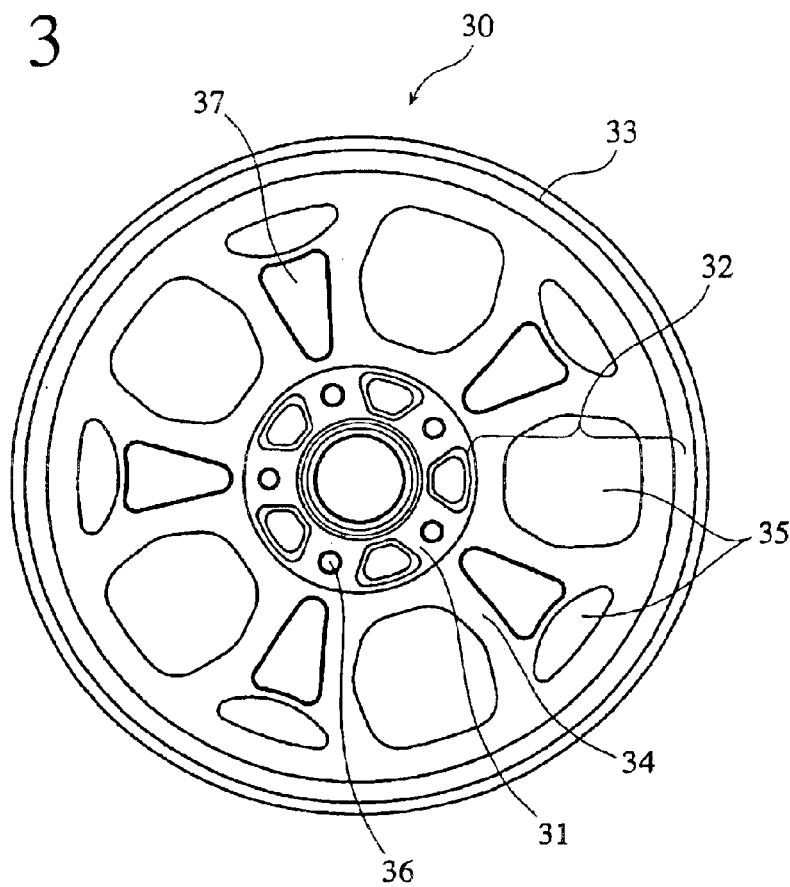
FIG. 3 is rear view showing a wheel according to another embodiment of the present invention.

20 spoke-type aluminum wheels were produced by a low-pressure casting method using a casting apparatus having three stokes as in EXAMPLE 7 and a lower die 8 and an upper die 12 with changed shapes, under the same casting conditions as in EXAMPLE 1 except that dent portions on the rear side of a hub portion had taper angles of 3.5°. FIG. 3 shows the rear surface of the wheel. Neither scratch nor deformation was observed on the design surfaces of the resultant aluminum wheels, confirming that every wheel was in a good shape.

EXAMPLE 9

The cooling of a die was investigated in the casting apparatus having three stokes in EXAMPLE 3. One stoke was positioned such that a melt was injected into a cavity for forming a hub portion of a wheel as in EXAMPLE 1, and the remaining two stokes were positioned such that a melt was injected into transversely movable dies 10 and then into a cavity for forming a rim portion of a wheel as in EXAMPLE 2.

Figure 16:
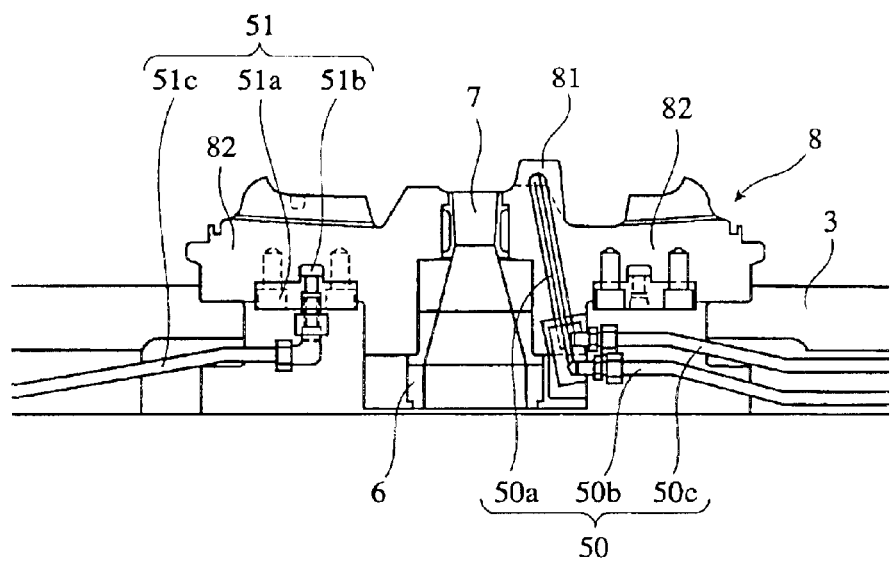
FIG. 16 is a cross-sectional view showing a cooling structure in the lower die.

FIG. 16 shows the details of the lower die 8. As shown in FIG. 16, a plurality of water-cooling mechanisms 50 and a water-cooling mechanism 51 are provided in the lower die 8. Each water-cooling mechanism 50 is arranged with its end directed to each die projection 81 for forming each bolt hole recess on a disc surface of a wheel, so that it cools mostly the hub portion. Each die projection 81 has a taper angle of about 3.0–10.0°. Cooling water flows into a cooling pipe 50a toward each die projection 81 through a pipe 50b. The cooling pipe 50a has a double pipe structure, in which a water flow direction in an inner pipe is opposite to that between an outer pipe and an inner pipe. Cooling water reached to a tip end of each die projection 81 through the inner pipe returns to a pipe 50c.

The cooling mechanism 51 for cooling a disc portion (particularly spoke portions) is constituted by a cooling water path comprising a groove 51b substantially annular about a wheel axis near a portion 82 for forming spoke portions of a wheel in a lower portion of the lower die 8, and a member 51a for sealing the groove 51b. Water flowing into this cooling water path from a pipe 51c cools a die portion 82 corresponding to the spoke portions. At the taper angle of the die projection 81 of 3–10°, a temperature of 450° or higher in a cavity surface in die recesses causes the peeling of a die-parting coat, resulting in reaction of the melt with the die, leading to galling. Accordingly, cooling conditions are determined such that the highest temperature on the cavity surface is lower than the galling temperature.

Figure 17:
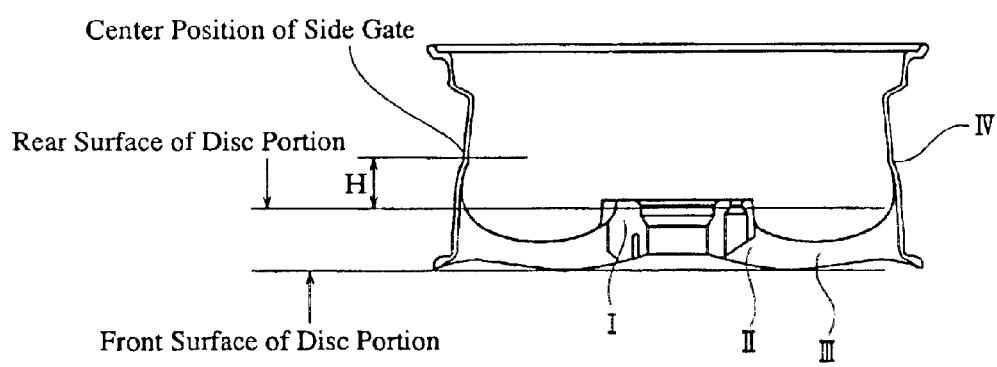
FIG. 17 is a cross-sectional view showing portions of a wheel in which DAS values were measured.
Figure 18:
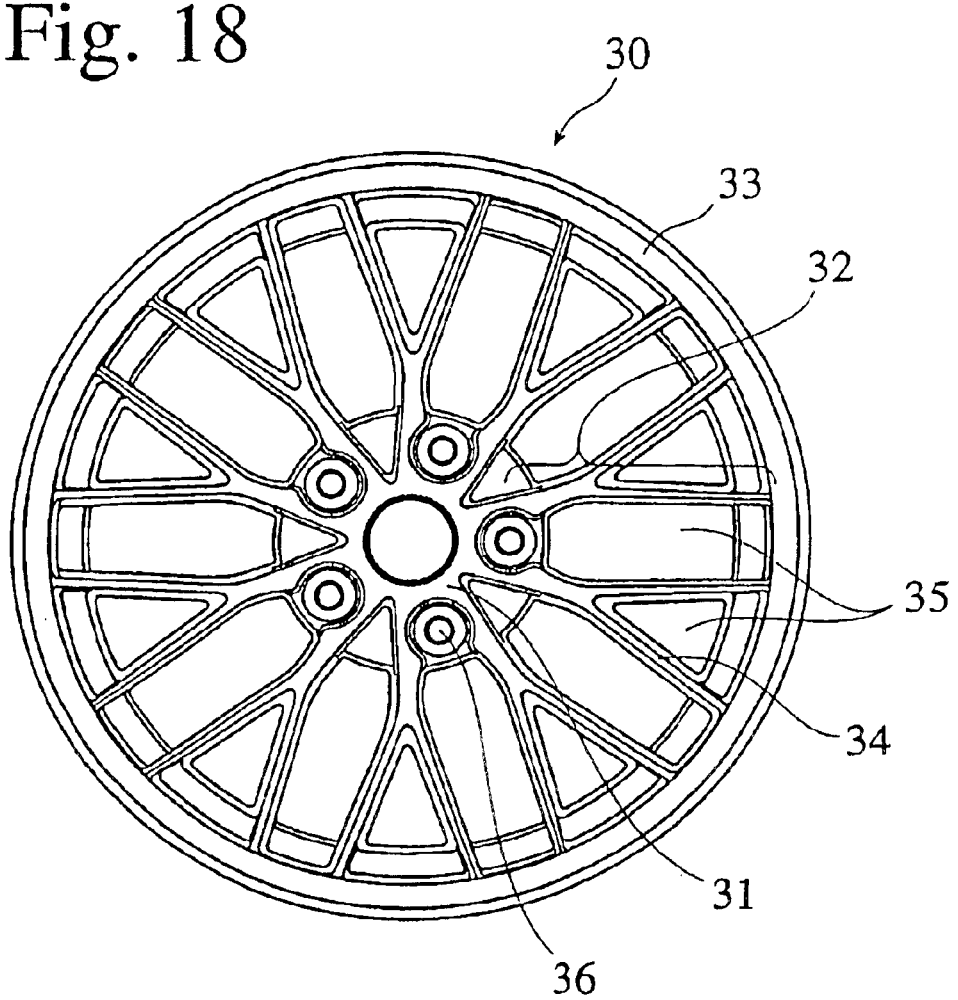
FIG. 18 is a front view showing a conventional wheel.
Figure 19:
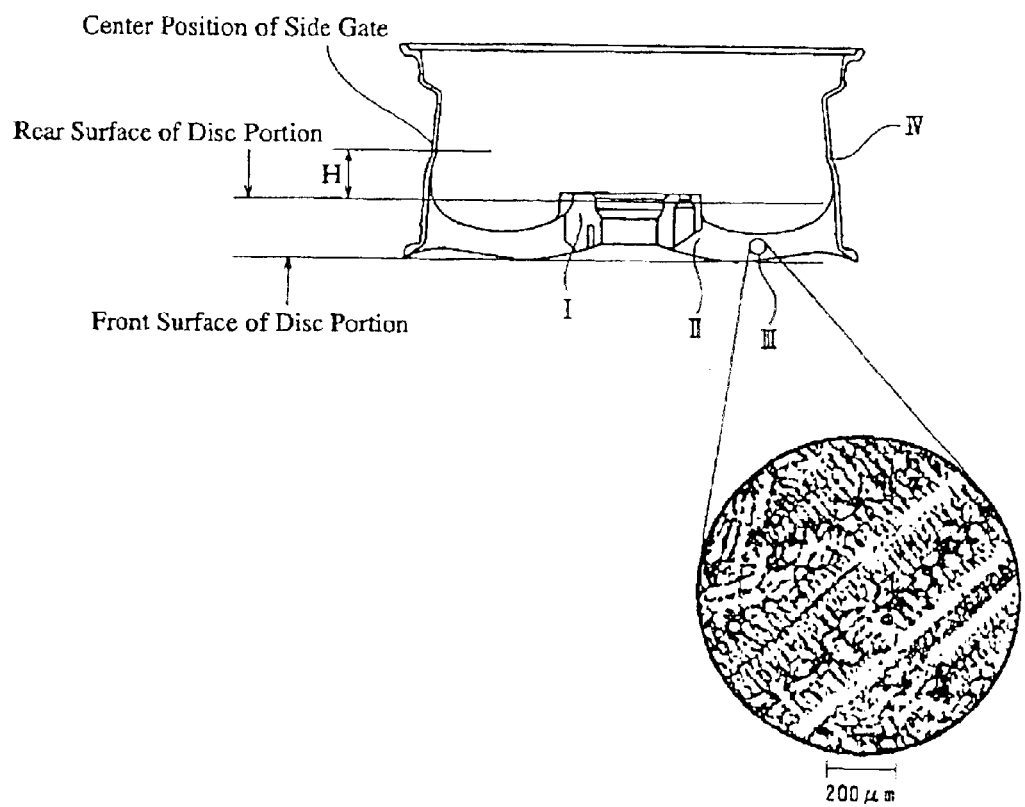
FIG. 19 is a cross-sectional view showing a dendrite phase at the portion III of the wheel in an enlargement on a large scale observed by a light microscope of 50×magnification in FIG. 17.
Figure 20:
FIG. 20 is a photograph showing a DAS value "N" as a distance between secondary arms on both sides of the stem of a dendrite observed by a light microscope of 50×magnification.

The wheel cast by the above method has an extremely small DAS value in center portions of the spoke portions. FIG. 17 shows the cross section shape of the wheel after working. Table 1 shows the DAS values in portions I-IV shown in FIG. 17. All wheels of EXAMPLES 3 and 5 produced by using this lower die 8 had DAS values of less than 30 μm in center portions of the spoke portions. It was also confirmed that the DAS values in center portions of the spoke portions and a hub portion were extremely small, and that they were smaller than the DAS value in a center portion of the rim portion. Though the DAS values in Table 1 are measurement results at side gate positions, the same tendency was also appreciated in the DAS values at positions deviated 90° therefrom. Table 1 also shows the DAS values of a wheel produced by a center gate method.

TABLE 1

| | DAS value (μm) | | | |
|---|---|---|---|---|
| Measurement Position | Portion I Hub Portion | Portion II Spoke Portion on Hub Side | Portion III At Center of Spoke Portion | Portion IV At Center of Rim Portion |
| EXAMPLE 3 | 30 | 27 | 25 | 50 |
| EXAMPLE 5 | 30 | 28 | 25 | 50 |
| REFERENCE EXAMPLE 2 | 30 | 35 | 25 | 50 |
| Center Gate Method | 40 | 40 | 37 | 34 |

REFERENCE EXAMPLE 1

Aluminum wheels were produced in the same manner as in EXAMPLE 9 except for using a lower die 8 in which each bolt hole recess 36 in a hub portion had a taper angle of 4° and depth of 20 mm. As a result, wheels free from scratch in the recesses 36 and having good cast surfaces were obtained.

REFERENCE EXAMPLE 2

Casting was carried out under the same conditions as in EXAMPLE 1 without cooling portions near bolt holes. After 200–300 cycles of casting were carried out, the galling of a melt took place in the vicinity of die projections 81 in FIG. 16, resulting in poor casting of the wheels, which needed much time to repair the dies. The measurement values of DAS are also shown in Table 1.

EXAMPLE 10

Using a casting apparatus shown in FIGS. 10(a)-(c), the same aluminum wheels as in EXAMPLE 1 were produced by a low-pressure casting method.

First, as shown in FIG. 10(b), the first hydraulic cylinder 20 was lowered to cause the upper die 12 to come into contact with the lower die 8 and the transversely movable dies 10, so that the die assembly was clamped at a pressure of 10 MPa. Thereafter, a compressed gas such as the air, an inert gas, etc. at 0.02–0.05 MPa was introduced into the closed container 1 through a pipe 18. With the compressed gas, the melt 5 of aluminum (AC4CH) kept at about 700° C. in the melt-holding furnace 2 was lifted in the stoke 4b, so that it entered into the cavity of the die assembly kept at 350–450° C. An inner surface of the cavity was covered with a temperature-keeping, die-parting coating material.

After about 2–3 minutes from the injection of the melt, the compressed air was evacuated, and an unsolidified melt 5 in the stoke 4 was returned to the melt-holding furnace 2. After the solidification of the melt in the die cavity was completed, and after the temperature lowered to about 400–450° C., the clamping force of the die assembly was reduced to 0 MPa.

Because the cast wheel 25 remained attached to the upper die 12, the upper die 12 was elevated as it was. The elevation of the upper die 12 was carried out by synchronously driving four second hydraulic cylinders 21. As shown in FIG. 10(c), after the piston 21a reached a position $P_2$, the first hydraulic cylinder 20 was driven to fully elevate the upper die 12. At a time when the upper die 12 was sufficiently elevated, the cast wheel 25 was removed from the upper die 12 by pushing pins (not shown) fixed to the upper platen 13, and received on a withdrawal member 11 rotated to a position just thereunder [FIG. 10(a)]. This cycle was repeated to continuously cast a large number of aluminum wheels.

Thus cast were 20 aluminum wheels having spoke portions, 50% or more of their taper angles θ being less than 5°, to observe whether or not there were scratch and deformation on their design surfaces. As a result, neither scratch nor deformation was observed on the design surfaces, confirming that every wheel was in a good shape.

As described above in detail, the light alloy wheel for a vehicle of the present invention has an as-cast design surface with spoke portions of small taper angles. Also, the light alloy wheel for a vehicle of the present invention has spoke portions providing thinner impression than those conventional without working their tapered surfaces. Even when the wheel has dent portions, as-cast spoke portions have small taper angles.

By providing a portion of the lower die near the hub portion with an optimum cooling structure, it is possible to obtain the light alloy wheel for a vehicle having much higher strength than the conventional ones and good castability with less casting defects particularly in spoke portions.

Because the light alloy wheel having the above features for a vehicle according to the present invention has a substantially as-cast design surface, it has not only excellent design but also is light in weight and low in cost.

What is claimed is:

1. A light alloy wheel for a vehicle integrally cast by a low-pressure casting method comprising a disc portion comprising a hub portion and a design portion and a rim portion, said design portion having substantially as-die-cast spoke portions having at least partially taper angles of less than 5.0° and at least part of said spoke portions having a dendrite, and having no scratch and deformation on said design portion.

2. The light alloy wheel for a vehicle according to claim 1, wherein a substantially as-die-cast dent portion having at least partially a taper angle of less than 5.0° is formed on the rear side of each spoke portion.

3. The light alloy wheel for a vehicle according to claim 1, wherein those having a taper angle of less than 5.0° among said spoke portions have a minimum width of 5 mm or less and a height of 20 mm or more.

4. The light alloy wheel for a vehicle according to claim 1, wherein said spoke portions have a taper angle of 4.0° or less.

5. The light alloy wheel for a vehicle according to claim 1, wherein said spoke portions have a taper angle of 3.5° or less.

6. The light alloy wheel for a vehicle according to claim 1, wherein at least part of said spoke portions have a DAS value of less than 30 μm.

7. A light alloy wheel for a vehicle comprising a disc portion comprising a hub portion and a design portion and a rim portion, said design portion having substantially as-die-cast spoke portions having at least partially taper angles of less than 5.0° and at least part of said spoke portions having a dendrite, wherein the maximum DAS value of said rim portion is larger than the DAS value of said hub portion.

8. A light alloy wheel for a vehicle integrally cast by a low-pressure casting method comprising a disc portion comprising a hub portion and a design portion and a rim portion, said design portion having substantially as-die-cast spoke portions having at least partially taper angles of less than 5.0°, wherein the maximum DAS value of said rim portion is larger than the DAS value of said hub portion.

* * * * *